United States Patent [19]

Wakabayashi et al.

[11] Patent Number: 5,715,482
[45] Date of Patent: Feb. 3, 1998

[54] COLLAPSIBLE TYPE ZOOM CAMERA

[75] Inventors: Hiroshi Wakabayashi, Yokohama; Hidenori Miyamoto, Urayasu; Minoru Kato, Kawasaki; Isao Soshi, Tokyo; Junichi Omi, Kawasaki, all of Japan

[73] Assignee: Nikon Corporation, Tokyo, Japan

[21] Appl. No.: 796,855

[22] Filed: Feb. 7, 1997

Related U.S. Application Data

[63] Continuation of Ser. No. 352,734, Dec. 2, 1994, abandoned.

[30] Foreign Application Priority Data

Dec. 6, 1993 [JP] Japan .................. 5-305504

[51] Int. Cl.⁶ .................. G03B 13/10; G03B 1/18
[52] U.S. Cl. .................. 396/79; 396/83; 396/84; 396/378; 396/379; 396/155
[58] Field of Search .................. 354/149.1, 222, 354/195.1, 195.12; 396/79, 83, 84, 378, 379

[56] References Cited

U.S. PATENT DOCUMENTS 5,287,137  2/1994  Hara et al. .................. 354/195.12
5,321,462  6/1994  Haraguchi et al. .................. 354/195.1
5,335,030  8/1994  Suzuka .................. 354/149.1
5,345,285  9/1994  Hasushita et al. .................. 354/159
5,461,443  10/1995  Nakayama et al. .................. 354/195.1

*Primary Examiner*—Michael L. Gellner
*Assistant Examiner*—Daniel Chapik

[57] ABSTRACT

A miniaturized collapsible zoom camera changes viewfinder magnification in accordance with a change in the photographic magnification. The camera is equipped with a collapsible cam tube to cause a first lens group, which rotates around the optical axis, to move from a collapsed position to a position just before a minimum magnification position. Likewise, a zoom cam tube causes the first lens group, which rotates around the optical axis, to move from the minimum magnification position to a maximum magnification position. Sector gears are formed on the outer circumference of the collapsible cam tube and the zoom cam tube. Furthermore, the camera is equipped with a cam tube drive gear which cooperates with the sector gears. A drive motor causes the drive gear to rotate. Another gear cooperates only with the sector gear of the zoom cam tube while a variable power and movement mechanism causes variable power operation in the viewfinder.

14 Claims, 9 Drawing Sheets

COLLAPSIBLE TYPE ZOOM CAMERA

This application is a continuation of application Ser. No. 08/352,734, filed Dec. 2, 1994, now abandoned.

BACKGROUND OF THE INVENTION

1. Field of the Invention

The present invention relates to a zoom camera which can change photographic enlargement characteristics of a photographic optical system and viewfinder. Moreover, the present invention relates to a collapsible zoom camera having a lens which is movable from a collapsed position within a camera body to a range of extended positions. The extended positions vary between a maximum magnification position in which the lens is fully extended from the camera and a minimum magnification position in which the lens is between the maximum magnification position and the collapsed position.

2. Description of the Related Art

An exploded perspective view of conventional zoom camera 200 is illustrated in FIG. 9. Conventional camera 200 can change an amount of photographic and viewfinder magnification. Camera 200 can also change a strobe illumination angle. A first lens (not shown) is disposed within cam tube 2. The photographic magnification of the first lens is movable to a collapsed position within a camera body (not shown) and to a range of extended positions away from the camera body. Photography is not possible in the collapsed position.

The extended positions include a minimum magnification position in which photography is possible. The minimum magnification position of the first lens is closer to the subject than the collapsed position of the first lens. Additionally, the first lens is movable to a maximum magnification position which is even closer to the subject than the minimum magnification position.

Conventional camera 200 is equipped with a lens support (not shown) which is arranged for motion in a direction parallel to the optical axis of the lens (not shown) with respect to the camera body (not shown). Conventional camera 200 also includes cam tube 2 which is arranged to rotate relative to the optical axis of the lens with respect to the camera body (not shown). Drive motor 8 causes cam tube 2 and viewfinder 120 to rotate. Due to this rotation, support shafts 126 and 127 move along the cam grooves 114a and 114b respectively, and, as a result, viewfinder variable power lenses 121 and 122 move in a direction in which a guide shaft 116 extends, approaching or separating from the fixed viewfinder lenses 123 and 125 and viewfinder frame 124. Additionally, conventional camera 200 is equipped with mechanism 5 which changes a magnification of camera 200 and changes an angle of illumination of strobe 130. By changing the angle of strobe 130, conventional camera 200 produces a variable illumination angle.

Cam 3 is disposed about an outer circumference of cam tube 2 to cause the lens support tube (not shown) to move. During the rotation of cam tube 2, the first lens (not shown) moves from the collapsed position to the minimum magnification position and then to the maximum magnification position. Gear 4 extends in a circumferential direction about an outer circumference of cam tube 2.

Mechanism 5 provides a variable angle to strobe 130 and operates under variable power. Mechanism 5 includes gear group 6 which engages with gear 4 of cam tube 2. Cam body 7 also operates through a variable angle and under variable power. Cam body 7 oscillates in response to operation of gear group 6 and guide shafts 116 and 117 to guide moving lenses 121 and 122 of viewfinder 120 in a parallel direction to the optical axis. Strobe body 131 also moves in a direction parallel to the optical axis. Cam body 7 includes variable power cams 7a and 7b which respectively cooperate with support shafts 126 and 127. Support shafts 126 and 127 respectively support movable lenses 121 and 122 of viewfinder 120. Cam 7c changes the strobe illumination angle of strobe 130 by cooperating with support shaft 134 of strobe body 131.

In the above prior art example, drive motor 8 is driven and cam tube 2 rotates from a collapsed state to an extended state in which photography is possible. The extended states include a position between the minimum magnification position and the maximum magnification position. During rotation of cam tube 2, the lens support tube (not shown) moves from the collapsed position to the minimum magnification position. Cam body 7 also oscillates such that movable lenses 121 and 122 of viewfinder 120, and strobe body 131, move in a direction parallel to the optical axis of the first lens.

Moreover, in a state in which photography is possible, i.e. the range of extended positions, cam tube 2 is caused to rotate by drive motor 8 and the lens support tube (not shown) moves between the minimum magnification position and the maximum magnification position. In addition, variable power and variable angle cam body 7 oscillates such that movable lenses 121 and 122 of viewfinder 120 and strobe body 131 move in a direction parallel to the optical axis of the lens. Accordingly, the viewfinder magnification and the strobe illumination angle change in accordance with the photographic magnification.

In the above technology, variable angle action of the viewfinder is executed in the extended positions, i.e. a state in which photography is possible. Accordingly, a movement or change in the variable power and variable angle operation of the viewfinder results wherever there is movement between the collapsed position of the lens and an extended position. Specifically, for a movement of the lens tube (not shown) between the collapsed position and the minimum magnification position, cam body 7 oscillates, and movable lenses 121 and 122 of viewfinder 120 as well as strobe body 131 move. In this manner, even in a state in which photography is not possible, because viewfinder 120 and strobe 130 result in a variable power and variable angle operation, the range of movement of movable lenses 121 and 122 of the viewfinder 120, and the range of movement of strobe body 131, become large. In addition, the movement of cam body 7 to secure the above movements becomes large, which requires an increase in the size of the camera body.

Image blur suppression devices work within an optical system such as a camera and have as their object the suppression or reduction of blurring in an image projected onto an image plane. A motion compensation device is a type of image blur suppression device which compensates for motion incident upon the optical system. Motion is typically imparted to the optical system by way of vibrations in the optical system itself or in a surrounding holding member. In general, known motion compensation devices cause a compensation lens to shift counter to the motion of the optical system so as to shift the image projected by the optical system relative to the optical system.

SUMMARY OF THE INVENTION

Accordingly, it is an object of the present invention to address the above problems by providing a collapsible zoom camera with an encasing body of relatively a small size.

It is a further object of the invention to provide a collapsible zoom camera which can change photographic magnification and the magnification of a viewfinder in accordance with changes in the photographic magnification. The collapsible camera includes a first lens which moves to a collapsed position within the camera body. The first lens also extends to a minimum magnification position which is closer to a photographic subject than the collapsed position. The first lens also extends from the minimum magnification position to a maximum magnification position which is closer to the photographic subject than the minimum magnification position.

It is another object of the invention to to provide a lens barrel having a lens support tube arranged for relative motion in a direction parallel to the optical axis of the first lens. The lens support tube supports the first lens. A fixed tube is arranged on the outer circumference of the lens support tube and does not move with respect to the camera body. A collapsible cam tube is arranged outside of the fixed tube which rotates relative to the optical axis of the lens and with respect to the camera body. A zoom cam tube is arranged closer to the photographic subject than the collapsible cam tube and is also disposed on the outside of the fixed tube. The zoom cam tube also rotates relative to the optical axis of the lens with respect to the camera body.

It is still another object of the invention to provide a follower projection in the lens support tube which projects in a radial direction with respect to the optical axis of the first lens. A rectilinear guide portion is formed in the fixed tube and cooperates with the follower projection to move the first lens from the collapsed position to the position of maximum magnification. The rectilinear guide portion also guides the follower projection portion in a direction parallel to the optical axis of the first lens. A spiral cam portion is formed with respect to the optical axis in the collapsible cam tube. The first lens cooperates with the follower projection portion from the collapsed position to reach a position just before the minimum magnification position. In addition, a sector gear portion extends in the circumferential direction about an outer circumference of the cam tube.

It is still another object of the invention to provide a spiral cam portion formed with respect to the optical axis in the zoom cam tube. The follower projection portion for the first lens cooperates with the spiral cam portion to move from the collapsed position to the maximum magnification position. In addition, a sector gear portion extends in the circumferential direction in the outer circumference of the zoom cam tube. As such, a cam tube drive gear cooperates with the sector gear portion of the zoom cam tube and the sector gear portion of the collapsible cam tube. A drive source then causes the cam tube drive gear to drive a variable power gear. Cooperation is possible only with the sector gear portion of the zoom cam tube.

Objects of the invention are achieved by a drive source which is equipped with a variable power mechanism to cause variable power operation in the viewfinder which accompanies the rotation of the variable power gear. The collapsible cam tube rotates by way of a cam portion and the follower projection portion coupled to the rectilinear guide portion of the fixed tube to move the first lens in a range from the collapsed position at least as far as a position directly before the minimum magnification position. During operation, the sector gear portion of the collapsible cam tube cooperates with the cam tube drive gear. The zoom cam tube rotates in cooperation with the rectilinear guide portion of the fixed tube, by way of motion of the cam portion of the zoom cam tube and the follower projection portion.

Objects of the invention are also achieved through a cam tube which cooperates with a follower projection portion in a lens interval between a collapsed lens position and a point just before a minimum magnification position. A spiral shaped cam portion is formed with respect to the optical axis of the first lens so that the zoom cam tube cooperates with the follower projection portion in the interval, in which the first lens moves from the minimum magnification position to a maximum magnification position. A spiral shaped cam portion is also formed with respect to the optical axis of the first lens so that the collapsible cam tube rotates in a range in which the first lens moves from the collapsed position to a position just before the minimum magnification position. An individual cam tube rotation mechanism causes the zoom cam tube to rotate in the range in which the said first lens can be caused to move at least from the minimum magnification position to the maximum magnification position. A variable power mechanism provides variable power operation in the viewfinder accompanying only the rotation of the zoom cam tube. A drive amount detection unit also detects the drive amount of the cam tube rotation mechanism. The detection unit detects a standard position with respect to rotation around the optical axis of the cam tube of one side. A control circuit controls the cam tube rotation mechanism such that the drive amount becomes a predetermined amount. A reset unit resets the drive amount.

Objects of the invention are achieved in the collapsed state by cooperation of the cam tube drive gear and a sector gear of a collapsible cam tube. Moreover, a follower projection portion formed in a lens support tube cooperates with a rectilinear guide portion of a fixed tube and with a cam portion of the collapsible cam tube. In the collapsed position and when the drive source is caused to drive, cam tube drive gears rotate and the collapsible cam tube rotates. Moreover, during the state of the collapsed position of the cam tube, the zoom cam tube cannot rotate because its rotation is restricted by a cam tube restriction mechanism. When the collapsible cam tube rotates, the follower projection portion cooperates with the cam to move in a direction containing a component direction parallel to the optical axis because the position of the cams formed in the zoom cam also changes. During such movement, because the follower projection portion cooperates with the rectilinear guide portion of the fixed tube, the lens support tube is guided in a direction parallel to the optical axis.

Objects of the invention are also achieved when the collapsible cam tube rotates and when the first lens reaches a point just before the minimum magnification position, the follower projection portion that cooperates with the cam portion of the collapsible cam tube moves perpendicularly to the cam portion of a zoom cam tube. Furthermore, a cam tube drive gear cooperates with a sector gear of the zoom cam tube. Because of this operation and by the rotation of the cam tube drive gear, the zoom cam tube rotates from a minimum magnification position and the first lens is caused to move. Furthermore, the cam tube rotation mechanism begins rotation of the zoom cam tube. Similar to the operations described above, the follower projection portion of the lens support tube is guided by the rotation of the zoom cam tube to thereby cause the first lens to move. Accordingly, the collapsible cam tube cannot rotate because its rotation is also restricted by the cam tube rotation restricting mechanism. However, because the variable power gear cooperates only with the sector gear of the zoom cam tube, the viewfinder variable power cam rotates while causing the zoom cam tube to rotate and to perform variable power operation between a minimum magnification position and a maximum magnification position. In other words, the viewfinder variable power mechanism operates by the rotation of the zoom cam tube alone. Furthermore, the variable power viewfinder, which operates by way of the variable power mechanism, does not operate from the collapsed state (in which photography is impossible) to just before a minimum magnification state. Accordingly, an operating stroke of the movable portion of the viewfinder itself and an operating stroke of the movable portion of the variable power mechanism of the viewfinder can be shortened, and the camera body can be designed for a small size.

Moreover, objects of the present invention are achieved when two cam tubes are individually caused to rotate as mentioned above. During rotation, it is typical for a position of the respective independent drive sources to change. Nevertheless, in the present invention, sector cams are formed on an outer circumference of respective cam tubes. Because formation regions of the respective sector gears are fixed, one cam tube drive gear is caused to cooperate with the sector gears. Further, because such sector gears are caused to rotate by one drive source, two cam tubes can each be individually rotated. Accordingly, the present invention accommodates more than one cam tube without causing an increase in camera size.

Moreover, according to objects of the present invention as described above, the point at which the two cam tubes are divided is such that when the follower projection portion moves down from the cam portion of the collapsible cam tube to the cam portion of the zoom cam tube, it is important that the end portions of the two cams portions fit together. For this purpose, the present invention provides relative positional relationships to be maintained in the direction of rotation of both cam tubes at the same time. Among the two cam tubes, rotation is restricted by the cam tube rotation restricting mechanism.

Objects of the present invention are achieved by movement of a collapsible cam tube from the collapsed position to a position just before the minimum magnification position. From the minimum magnification position to the maximum magnification position, a first lens moves by only the rotation of the collapsible cam tube. Because of this mode of operation, the variable power mechanism of the viewfinder operates by only the rotation of the collapsible cam tube. Furthermore, by this variable power mechanism, the viewfinder does not operate from the collapsed state (in which photography is impossible) to the state just before the minimum magnification position. Accordingly, an operation stroke of the movable portion of the viewfinder itself and the operation stroke of the movable portion of the variable power mechanism of the viewfinder can be made short and the camera body can be designed to be a smaller size.

Objects of the present invention are also achieved by two cam tubes rotating by a single drive source. Thus, a large camera size can be avoided.

The present invention also achieves its objects by providing a collapsible zoom camera that includes, a drive unit providing a drive force, a movable photographic optical system movable in a first region about the optical axis of the photographic optical system and in a second region about the optical axis of the photographic optical system, a viewfinder optical system, a photographic optical system movement unit, a viewfinder optical system movement unit, a drive force transmission unit to transmit the drive force to the photographic optical system movement unit and to the viewfinder optical system movement unit while the photographic optical system is in the first region and to transmit the drive force to the photographic optical system movement unit while the movable photographic optical system is in the second region. Additionally, a drive amount detection unit detects the amount of movement of the photographic optical system. A reset unit resets the drive amount when a standard amount of movement has been detected by the drive amount detection unit and a control unit controls the drive unit based on the amount of movement detected by the drive amount detection unit.

The present invention also achieves its objects by providing a collapsible type zoom camera including a drive unit providing a drive force, a movable photographic optical system movable in a first and second region about the optical axis of the photographic optical system, a viewfinder optical system, a photographic optical system movement unit, a viewfinder optical system movement unit, a drive force transmission unit transmitting the drive force to said photographic optical system movement unit and to the viewfinder optical system measurement unit while said photographic optical system is in the first region and transmitting said drive force to said photographic optical system movement unit while the movable photographic optical system is in the second region, a drive amount detection unit detecting the amount of movement of the photographic optical system, a reset unit resetting the drive amount when a standard amount of movement has been detected by the drive amount detection unit, and a control unit controlling the drive unit based on the amount of movement detected by the drive amount detection unit.

Additionally, objects of the present invention are achieved through a collapsible type zoom camera including a lens barrel holding a first lens capable of moving from a collapsed position within a camera body to a minimum magnification position in which photography is possible and to a maximum magnification position in which photography is possible, a lens support tube moving in a direction parallel to the optical axis of the first lens while supporting the first lens and disposed on the outer circumference of the said lens support tube and not moving with respect to the camera body, a collapsible cam tube which is arranged outside of the fixed tube and rotating relative to the optical axis with respect to the camera body, and a zoom cam tube which is arranged more on the subject side than the said collapsible cam tube and also on the outside of the said fixed tube, and rotating relative to the optical axis with respect to the camera body. A follower projection is formed in the lens support tube and projects in a radial direction with respect to the optical axis. A rectilinear guide portion is formed in the fixed tube and cooperates with the follower projection to move the first lens from the collapsed position to the position of maximum magnification, and also to guide the follower projection in a direction parallel to the optical axis. A spiral cam portion is formed with respect to the optical axis in the collapsible cam tube by cooperation of the first lens with the follower projection from the collapsed position to reach a position just before the minimum magnification position. In addition, a sector gear portion extends in the circumferential direction in this outer circumference, and a spiral cam portion is formed with respect to the optical axis in the zoom cam tube. The follower projection moves the first lens from the collapsed position to the maximum magnification position. In addition, a sector gear portion extending in the circumferential direction in this outer circumference. One drive source causes the cam tube drive gear to rotate a variable power gear. Cooperation is possible only between the sector gear portion of the zoom cam tube. A variable power mechanism causes variable power operation in the viewfinder accompanying the rotation of the variable power gear. The collapsible cam tube rotates by the cam portion of the collapsible cam tube and the follower projection coupled to the rectilinear guide portion of the fixed tube to cause the first lens to move in a range from the collapsed position at least as far as a position directly before the minimum magnification position.

Finally, objects of the present invention are achieved through a collapsible zoom camera which includes a strobe having a variable illumination angle wherein a magnification change mechanism is configured to cause variable angle operation of the strobe in accordance with the rotation of the variable power cam.

BRIEF DESCRIPTION OF THE DRAWINGS

The present invention is described with reference to the attached figures of which.

DETAILED DESCRIPTION OF THE PREFERRED EMBODIMENTS

Figure 1:
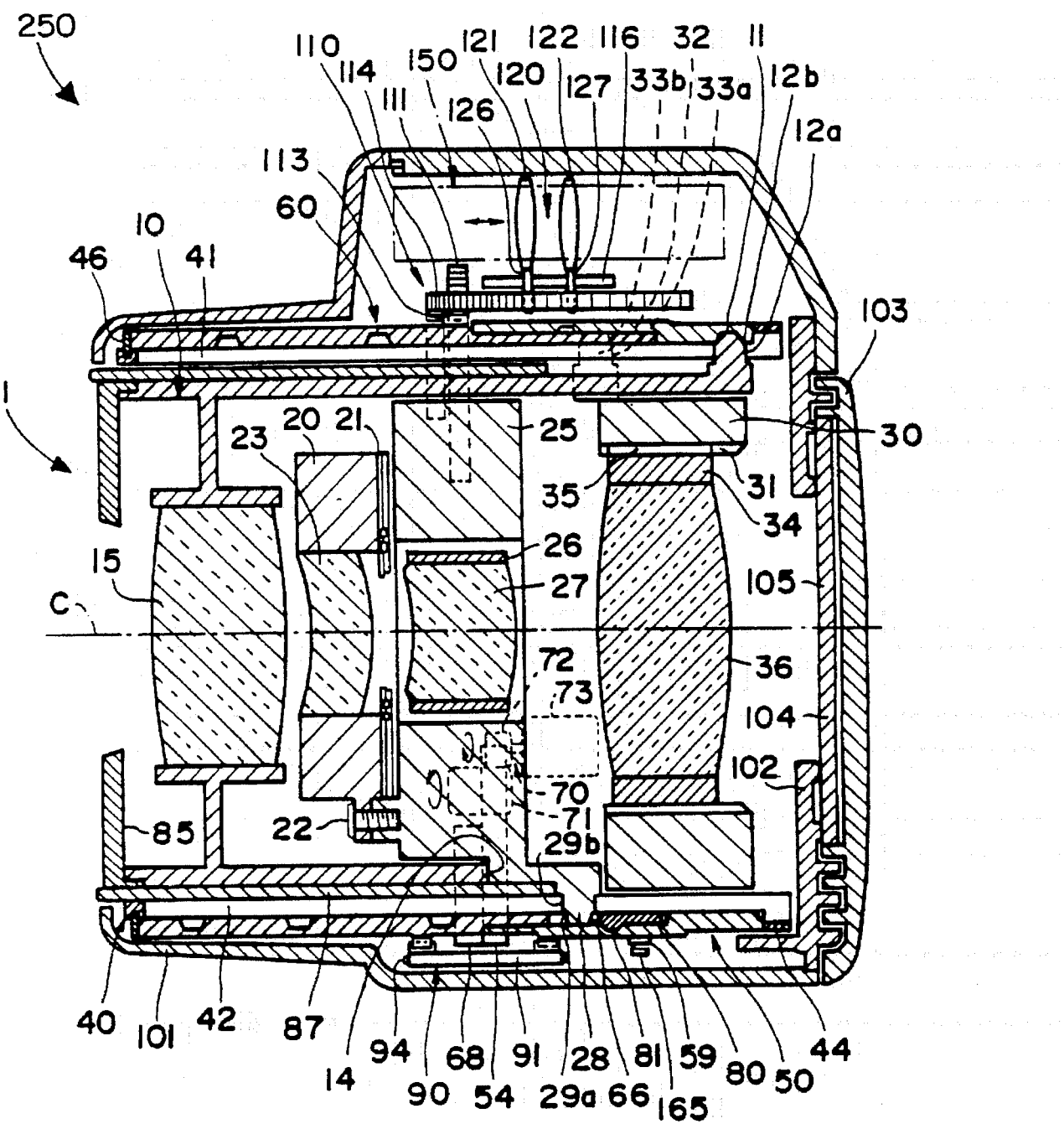
FIG. 1 is a cross sectional diagram illustrating a collapsed position of a collapsible zoom camera according to an embodiment of the present invention.

The preferred embodiments of a zoom camera according to the present invention will now be described with reference to the drawings and in particular FIGS. 1–8. Referring to FIG. 1, zoom camera 250 includes first lens group 15, a second lens group (including lenses 23 and 27) and third lens group 36. These lens groups are contained within support tube 10. Zoom camera 250 also includes stop ring 85 which is located in front of first lens group 15 and is supported by support tube 10.

Shutter block 20 is disposed next to shutter blind 21 and supports lens 23 of the second lens group. A motion compensation device in the form of anti-vibration unit 25 supports lens 23 of the second lens group by providing lens compartment 26 with a lens supporting ring. Helicoid ring 34 supports third lens group 36, which causes third lens group 36 to rotate around the optical axis by moving in a direction parallel to the optical axis C.

Fixed tube 40 is affixed to camera body base 102. Light shielding tube 87 shields the above lens groups during relative movement of support tube 10 in a direction parallel to the optical axis C. Zoom cam tube 60 and collapsible cam tube 50 are rotatable around optical axis C about an external circumference of fixed tube 40. Cam tube rotation mechanism 70 causes rotation of zoom cam tube 60 and collapsible cam tube 50. Cam tube rotation mechanism 70 and lift member 80 are movable in a direction parallel to the optical axis C between the internal circumferential side of zoom cam tube 60 and the external circumferential side of fixed tube 40.

Accompanying the rotation of either zoom cam tube 60 or collapsible cam tube 50 is cam tube rotation restriction mechanism 90 (see elements 90a and 90b of FIGS. 4–8), which restricts the rotation of one of tube 60 or tube 50 such that it does not rotate with respect to the other tube.

Stop ring 85 is affixed to support tube 10 to reduce the amount of incident light on first lens group 15. Shutter block 20 is affixed to anti-vibration unit 25 by screw 22. Anti-vibration unit 25 prevents image blur due to such causes as hand tremor. Anti-vibration unit 25 includes a mechanism (not shown) which causes motion in a direction at right angles with respect to the optical axis C.

First helicoid 35 is formed on an external circumference of helicoid ring 34. Second helicoid 31 is formed on an internal circumference of focusing unit 30. First helicoid 35 is screwed into focusing unit 30. Focusing unit 30 has a mechanism which causes movement in a direction parallel to the optical axis C when helicoid 34 and third lens group 36 rotate around the optical axis C.

Follower pin 11 is used with first lens group 15 and projects in a radial direction, i.e., a direction receding from the optical axis C, on the side of support tube 10 closest to film 105. Moreover, follower pin 28 is used with the second lens group (including lenses 23 and 27) and projects from anti-vibration unit 25 on a side closest to film 105.

Furthermore, follower pin 32, used with third lens group 36, also projects in the radial direction on the side of the focus unit 30 closest to the subject being photographed. Cylindrical portions 12a, 29a and 33a are formed on respective follower pins 11, 28 and 32. Taper portions 12b, 29b and 33b are also formed on respective follow pins 11, 28 and 32 extending downward from respective cylindrical portions 12a, 29a and 33a.

Figure 2:
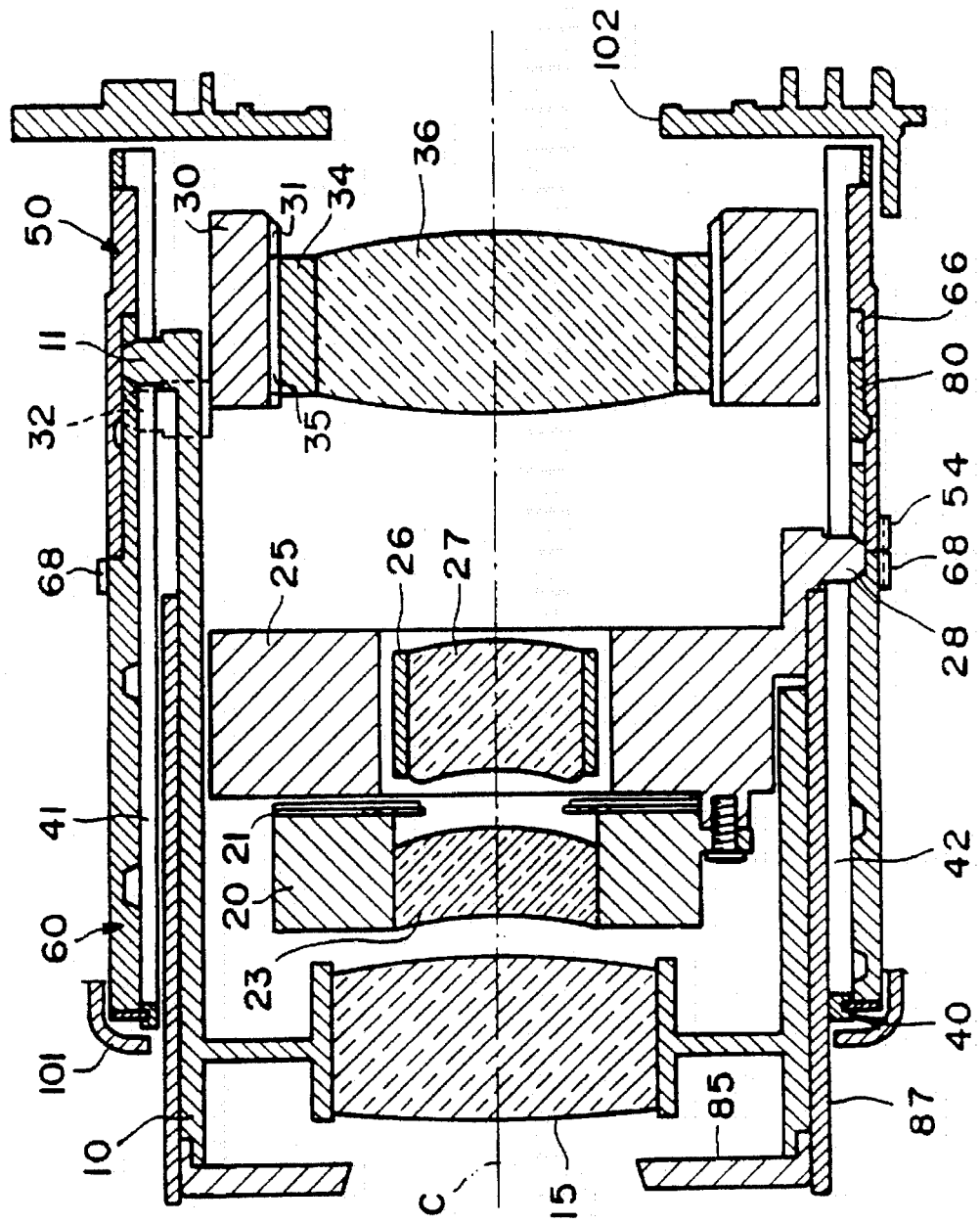
FIG. 2 is a cross sectional diagram illustrating a minimum magnification position of the collapsible zoom camera of FIG. 1.

Fixed tube 40 is illustrated in FIGS. 1 and 2 and more particularly in FIGS. 4–7. As illustrated in FIGS. 4–7, rectilinear guide apertures 41, 42 and 43 are formed in fixed tube 40 to respective guide follower pins 11, 28 and 32 in a direction parallel to the optical axis C. Corresponding follower pins 11, 28 and 32 oscillate in respective rectilinear guide apertures 41, 42 and 43. As illustrated in FIG. 1, each follower pin 11, 28 and 32 slidably contacts respective cylindrical portions 12a, 29a and 33a with respective inner surfaces of rectilinear guide apertures 41, 42 and 43.

Taper portions 12b, 29b and 33b of follower pins 11, 28 and 32 respectively project to the external circumferential side of fixed tube 40 from rectilinear guide apertures 41, 42 and 43. To regulate movement of zoom cam tube 60 and collapsible cam tube 50 in a direction parallel to the optical axis C, flange 44 is formed on fixed tube 40. Flange 44 projects in an external circumferential direction on a film side end portion of zoom cam tube 60. Likewise, range 46 projects in an external circumferential direction on a subject side end portion of zoom cam tube 60.

Figure 8:
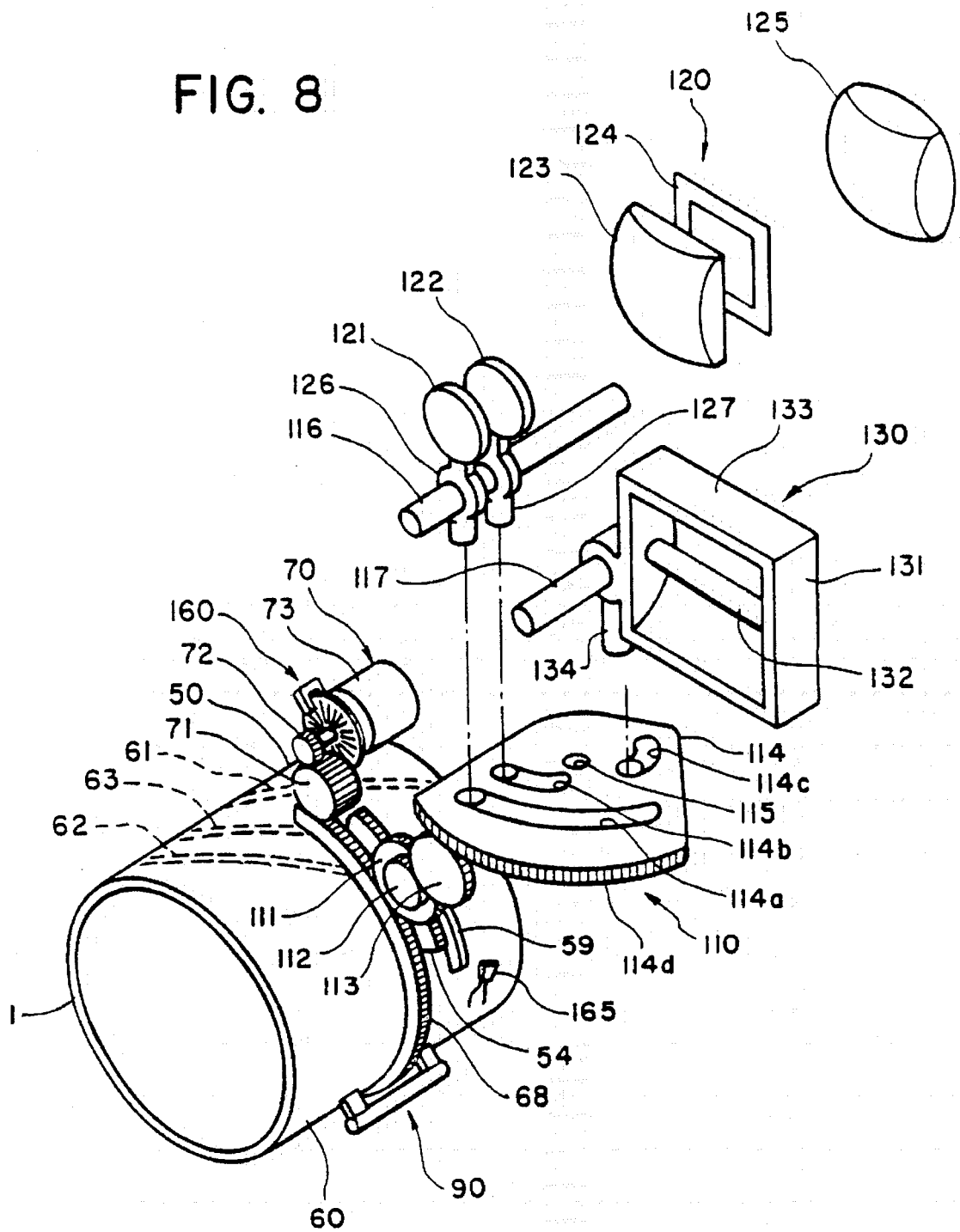
FIG. 8 is an exploded perspective view of a collapsible zoom camera according to an embodiment of the present invention.
Figure 9:
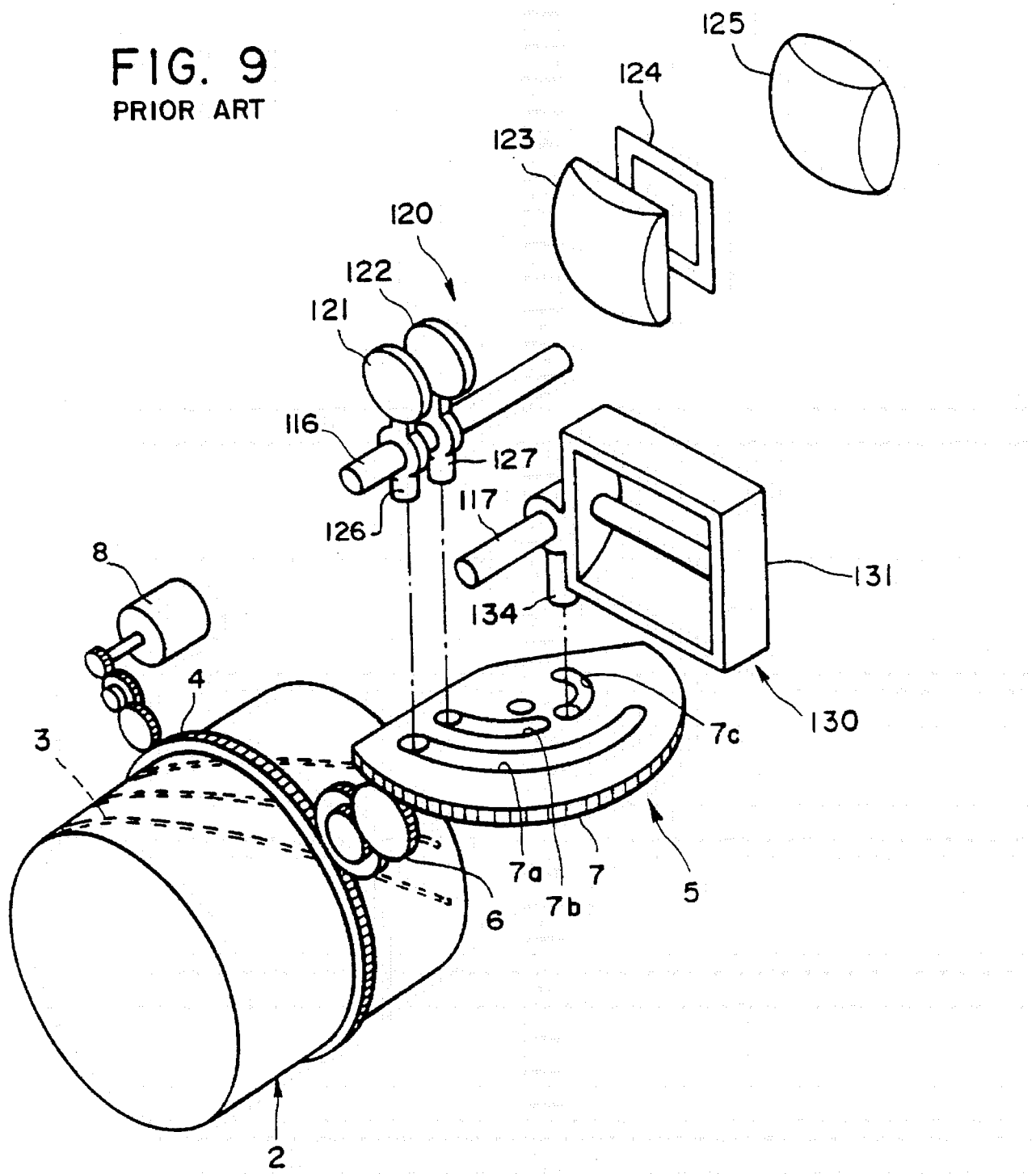
FIG. 9 is an exploded perspective view of a prior art collapsible zoom camera.

Zoom cam tube 60 has its film side plate thickness made thin. Moreover, collapsible cam tube 50 has its subject side plate thickness made thin. Both zoom cam tube 60 and collapsible cam tube 50 overlap about their respective thin plates. In zoom cam tube 60 and collapsible cam tube 50, as shown in FIGS. 1 and 8, cams 51, 61, 62 and 63 cooperate with tapered portions 12b, 29b and 33b of respective follower pins 11, 28 and 32.

Referring now to FIGS. 4–7, cams 51, 61, 62 and 63 are spirally formed with respect to the optical axis C. As part of cams 61, 62 and 63 of zoom cam tube 60, inner cams 61a, 62a and 63a are formed in respective portions of thick plate thickness, i.e. the subject side portion equals inner cam portion 64. In this regard, the inner cams 61a, 62a and 63a have groove bottoms formed on the inner circumferential side of zoom cam tube 60.

Penetrating cams 61b, 62b and 63b, i.e. the cams penetrating from the internal circumferential side of zoom cam tube 60 to the external circumferential side, are formed in portions where the plate thickness is thin, i.e. the film side portion equals cam portion 65. Internal cams 61a, 62a and 63a and penetrating cams 61b, 62b and 63b, cooperate with respective follower pins 11, 28 and 32, to form respective cams 61, 62 and 63.

Referring to FIGS. 1 and 4–6, cam 61 is used by first lens group 15 and is spirally formed from end to end with respect to the optical axis C. Cam 63 is used by third lens group 36. The subject side of cam 63 (indicated as the top of FIG. 4) extends spirally with respect to the optical axis C along cam portion 64 and cam portion 65. Optical axis C extends vertically from the top to the bottom of FIG. 4. The film side of cam 63 extends in a direction perpendicular to the optical axis C. Cam 63 includes portion 63c which extends in a perpendicular direction with respect to optical axis C. Cam 62 is used with the second lens group (including lenses 23 and 27). Cam 62 extends along cam portion 64 and cam portion 65. Cam 62 extends in a spiral direction with respect to the optical axis C. However, cam 62 is formed only partially on the subject side.

Lift member 80 enters into cam portion 65 of zoom cam tube 60. Lift member receiving portion 66 causes lift member 80 to move in a direction parallel to the optical axis C. Lift member receiving portion 66 is connected to the film side portion of cam 62 for use by the second lens group (including lenses 23 and 27).

Follower pin 81 projects in a radial direction with respect to the optical axis C in lift member 80. Inner cam 52, which cooperates with follower pin 81 of lift member 80, and cam 51, used by first lens group 15, are formed in collapsible cam tube 24. Cam 51 cooperates with follower pin 11 for use by first lens group 15. Inner cam 52 has a portion 52b which extends in a perpendicular direction with respect to the optical axis C, and an oblique portion 52a which extends in an oblique direction, i.e. an inclined direction, with respect to the optical axis C.

Figure 4:
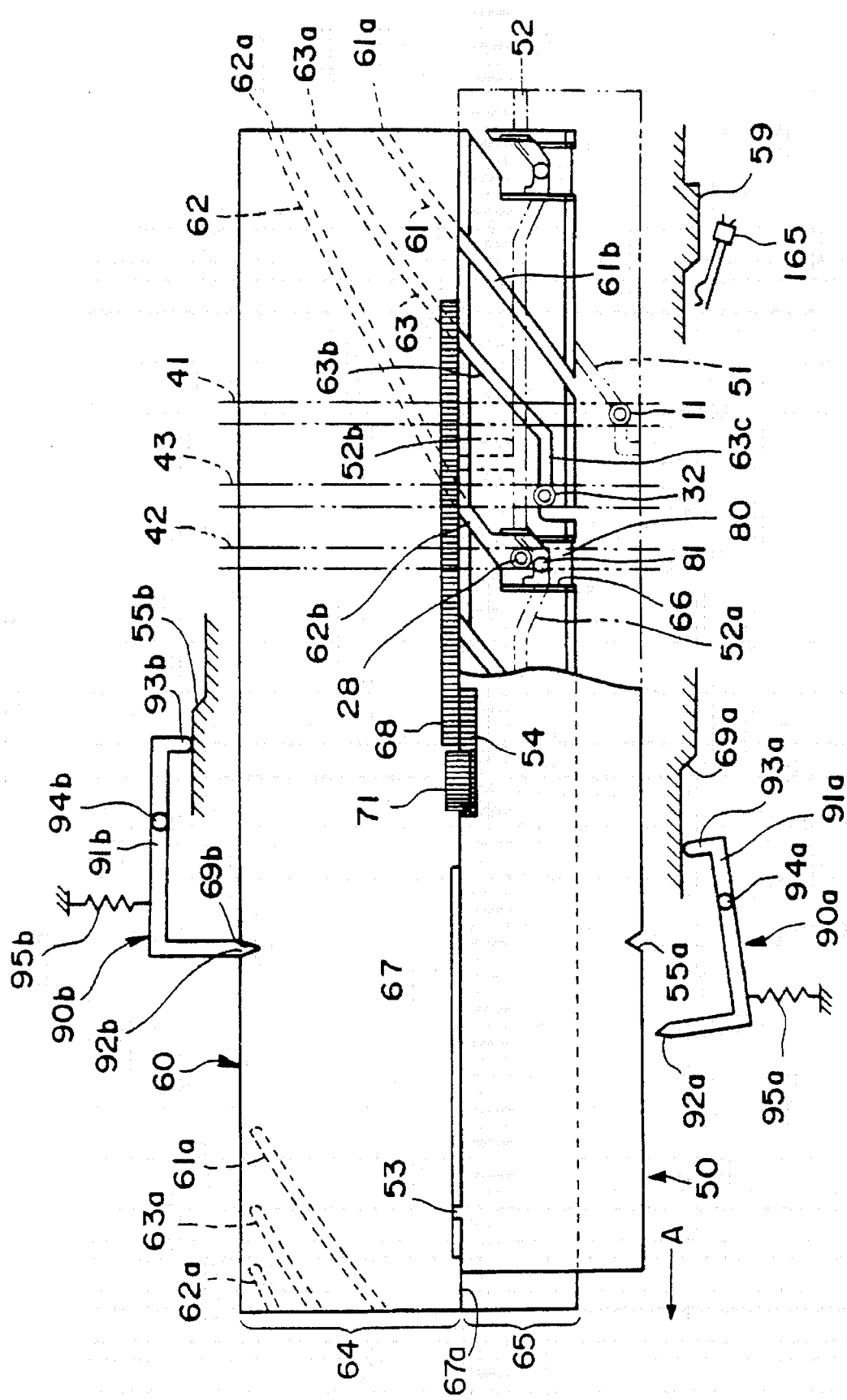
FIG. 4 is a top plan view of a zoom cam tube illustrating an intermediate state between the collapsed position and the minimum magnification position according to an embodiment of the present invention.
Figure 5:
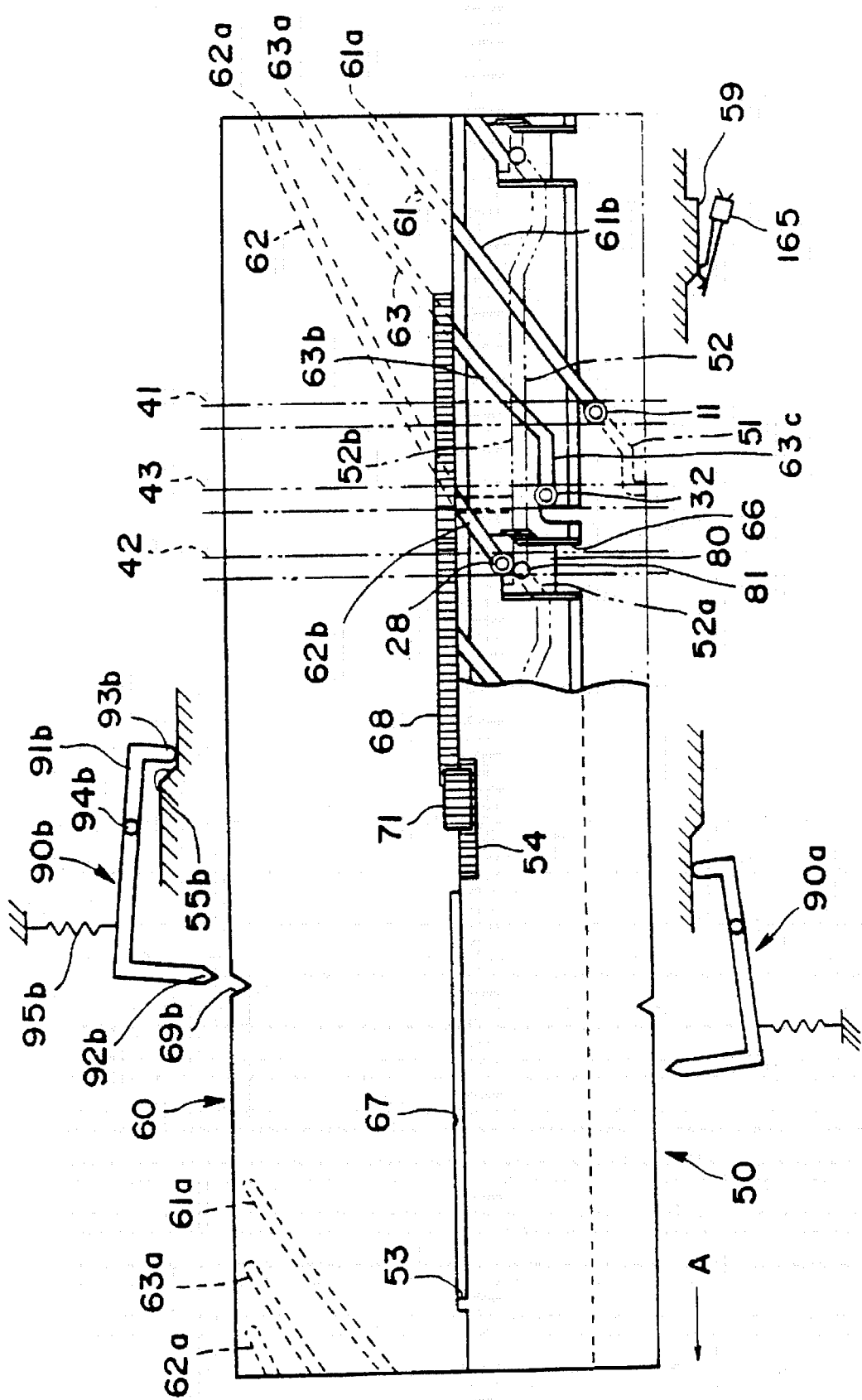
FIG. 5 is a top plan view of a zoom cam tube illustrating a minimum magnification position according to an embodiment of the present invention.
Figure 6:
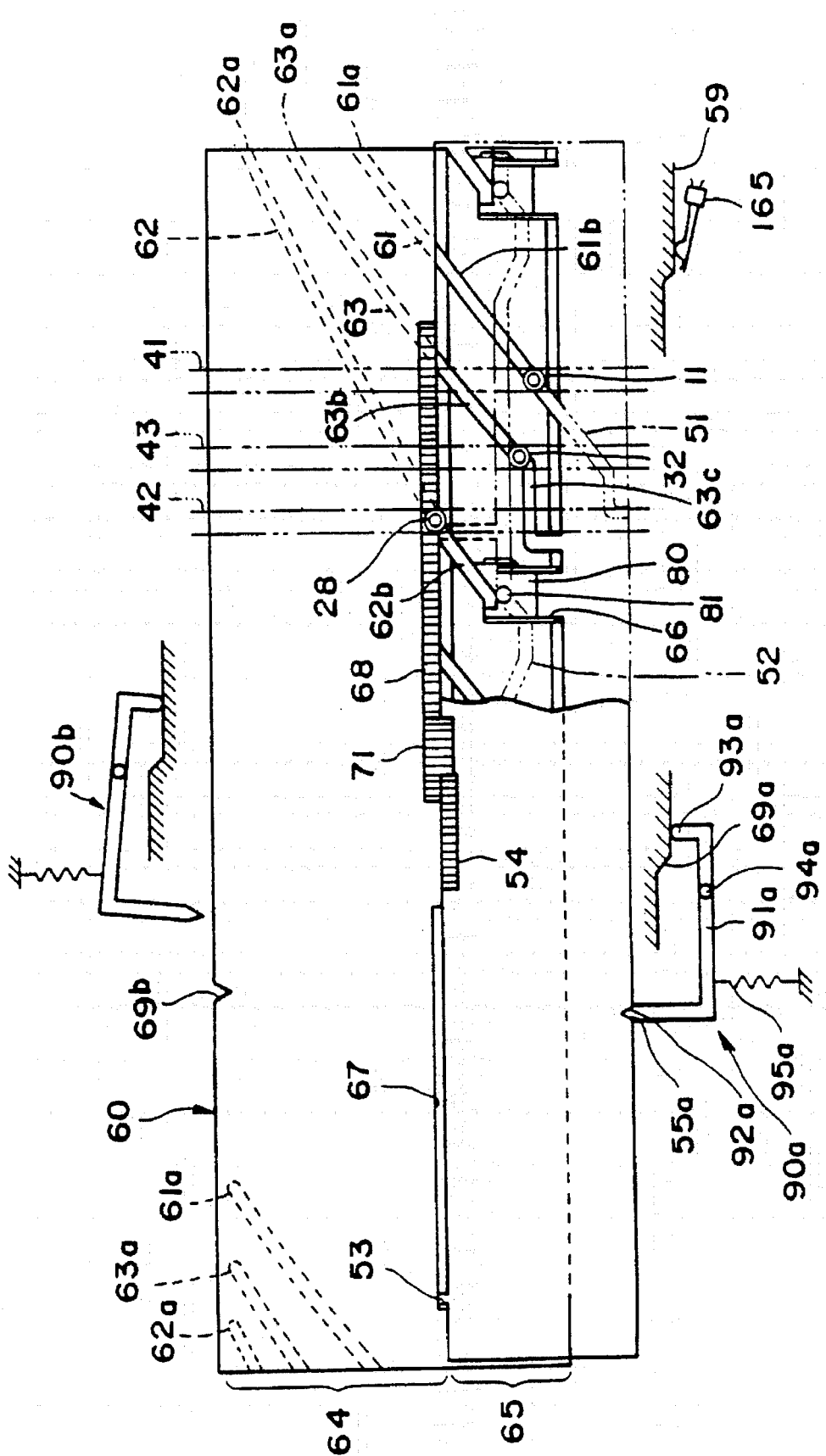
FIG. 6 is a top plan view of a zoom cam tube illustrating a maximum magnification position according to an embodiment of the present invention.
Figure 7:
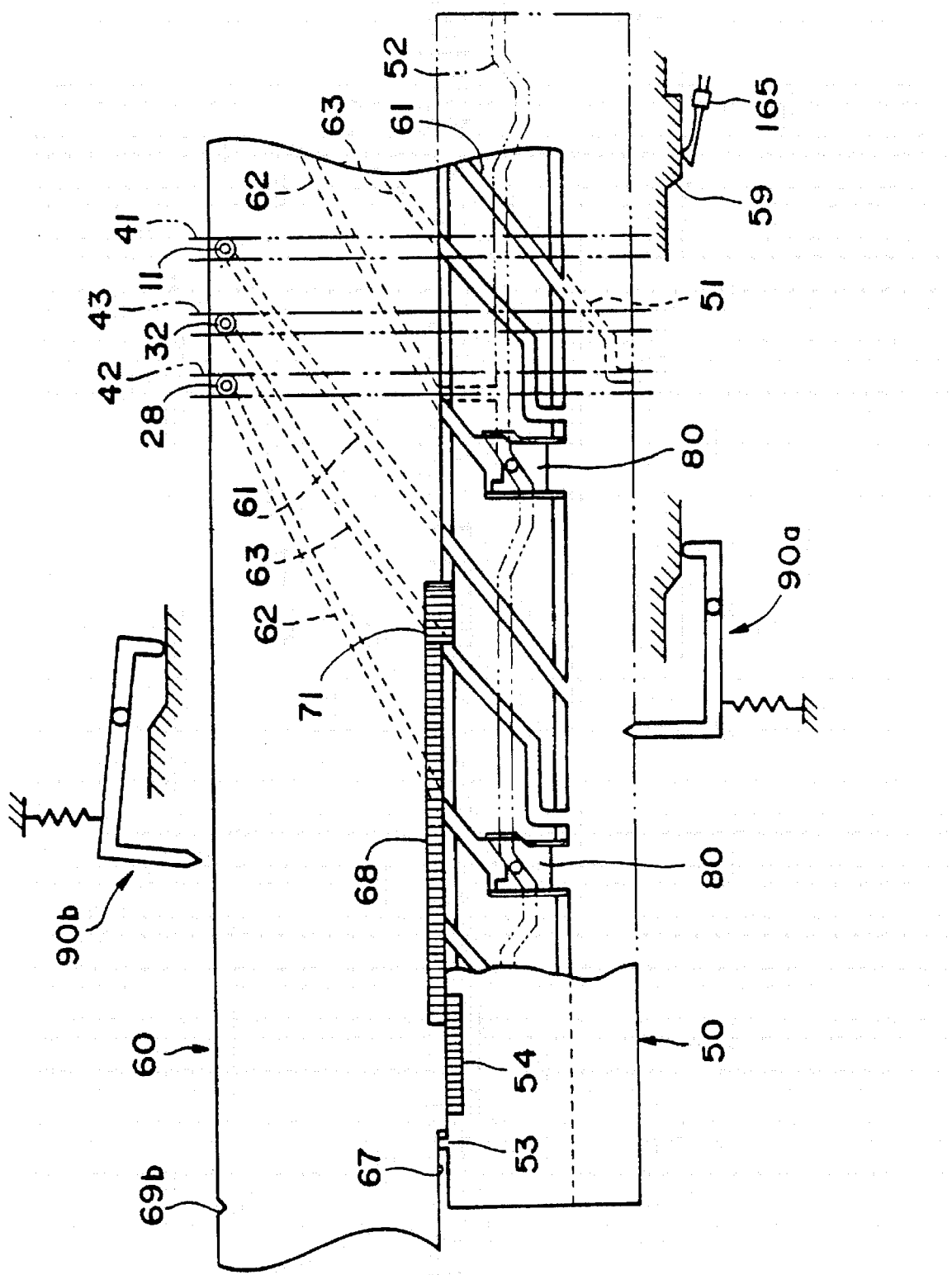
FIG. 7 is a top view of a zoom cam tube according to an embodiment of the present invention.

Referring now to FIGS. 4–6, projecting portion 53 is illustrated. Projecting portion 53, projecting towards the photographic subject side, is formed in the subject side end of collapsible cam tube 50. On the other hand, notch 67 into which projecting portion 53 of the collapsible tube 50 enters, is formed in an offset portion 67a, of altered thickness, of the zoom cam tube 60.

Notch 67 and projecting portion 53 secure the relative rotation of collapsible cam tube 50 and zoom cam tube 60 on the one hand, and secure integral rotation of collapsible cam tube 50 and zoom cam tube 60 on the other hand. In zoom cam tube 60 as illustrated in FIGS. 4–7, sector gear 68 extends in the circumferential direction in offset portion 67a. Moreover, in collapsible cam tube 50 there is also formed, in its circumferential side and also in the subject side end portion, sector gear 54 which extends in a circumferential direction. The relative position of sector gears 54 and 68 in the circumferential direction will be described during the description of the operation of this embodiment.

On the external circumferential side of zoom cam tube 60 and collapsible cam tube 50, cam tube drive gear 71, another drive gear 72 cooperating with cam drive gear 71, and drive motor 73 are arranged. Gears 71, 72 and motor 73 cause rotation of tubes 50 and 60 around the optical axis by cooperating with sector gears 54 and 68.

Cam tube rotation mechanism 70 includes sector gears 54 and 68, drive gears 71 and 72, and drive motor 73. On the external circumferential side of zoom cam tube 60 and collapsing cam tube 50, when projecting portion 53 of collapsible cam tube 50 is not placed in contact with the end portion of notch 67 of zoom cam tube 60, relative rotation of both cam tubes 50 and 60 is possible. With respect to the rotation of one cam tube, e.g. cam tube 50 or 60, on one side, rotation restriction mechanism 90 prevents the other cam tube from accompanying the rotation.

Rotation restricting mechanism 90 restricts the rotation of zoom cam 60 and likewise can restrict the rotation of collapsible cam 50. Rotation restricting mechanism 90 includes a pair of stop levers 91a and 91b, having stop portions 92a, 92b respectively formed at ends thereof. Cam follower ends 93a and 93b are respectively formed at respective other ends. Stop levers 91a and 91b are respectively urged by the force of springs 95a and 95b, such that each stop portion 92a and 92b is urged toward respective cams 50 and 60.

Stop portions 92a and 92b of rotation stop levers 91a and 91b respectively connect with stop portions 55a, 69b. When rotation restricting cams 69a and 55b are placed in contact with cam follower ends 93a and 93b of stop levers 91a and 91b, oscillation axes 94a and 94b movably support the rotation restricting stop levers 91a and 91b, respectively.

In order to make the action of rotation restricting mechanism 90 easily understood, rotation restriction mechanism 90 has been drawn as in FIG. 8. However, as shown in FIG. 1, stop lever 91 extends in a direction parallel to the optical axis C and extends over both cam tubes 50 and 60. A movement axis of stop lever 91 also extends in a direction parallel to the optical axis C. However, in the drawings and among zoom cam tube 60, zoom cam tube use 90b and zoom cam tube use 90a, extend over only one side.

Moreover, only one of the group including lift member 80, lift member receiving portion 66, respective follower pins 11, 28 and 32 of the members supporting lens groups 15, 23 and 36, and cams 51, 61 and 62 which cooperate with pins 11, 28 and 32, are drawn in the figures. However, in actuality, three of each of these elements are arranged in the camera. Moreover, there are three rectilinear guide apertures 41 (for first lens group 15), rectilinear guide apertures 42 (for the second lens group including lenses 23 and 27), and rectilinear guide apertures 43 (for third lens group 36) corresponding to respective follower pins 11, 28 and 32.

The camera body, as shown in FIG. 1, includes a rear portion, body cover 101 which covers the base of camera 250 and lens barrel 1, and back cover 103 for loading film 105. The camera body also includes pressure plate 104 which presses film 105 against the camera body. Also shown in FIG. 1 are variable power viewfinder 120 and strobe 130 having a variable illumination angle. Variable power and variable angle mechanism 110 changes the illumination angle of strobe 130. A film windup mechanism and a film rewind mechanism, etc., are not shown.

Referring to FIGS. 4–7, reset switch 165 is arranged in the external circumferential side of collapsible cam tube 50. Reset switch 165 detects the rotational standard position of collapsible cam tube 50 in order to reset the drive amount of cam tube drive motor 73. Moreover, convex portion 59 is formed in the external circumferential side of collapsible cam tube 50 for standard position detection in order to indicate the rotational standard position.

Moreover, in the above lens barrel device, a number of elements are illustrated such as: lift member 80, lift member receiving portion 66, respective follower pins 11, 18, and 32 to support lenses 15, 23 and 36, and cams 51, 61, 62 and 63 to cooperate with pins 11, 18 and 32. However, in order to maintain operation with no play, three elements are actually used. Also rectilinear guide aperture 41 is used for lens group 15, rectilinear guide aperture 42 is used for the second lens group (including lenses 23 and 27), and rectilinear guide aperture 43 is used for lens group 36 of fixed tube 40, corresponding in number to respective follower pins 11, 28 and 32.

Figure 3:
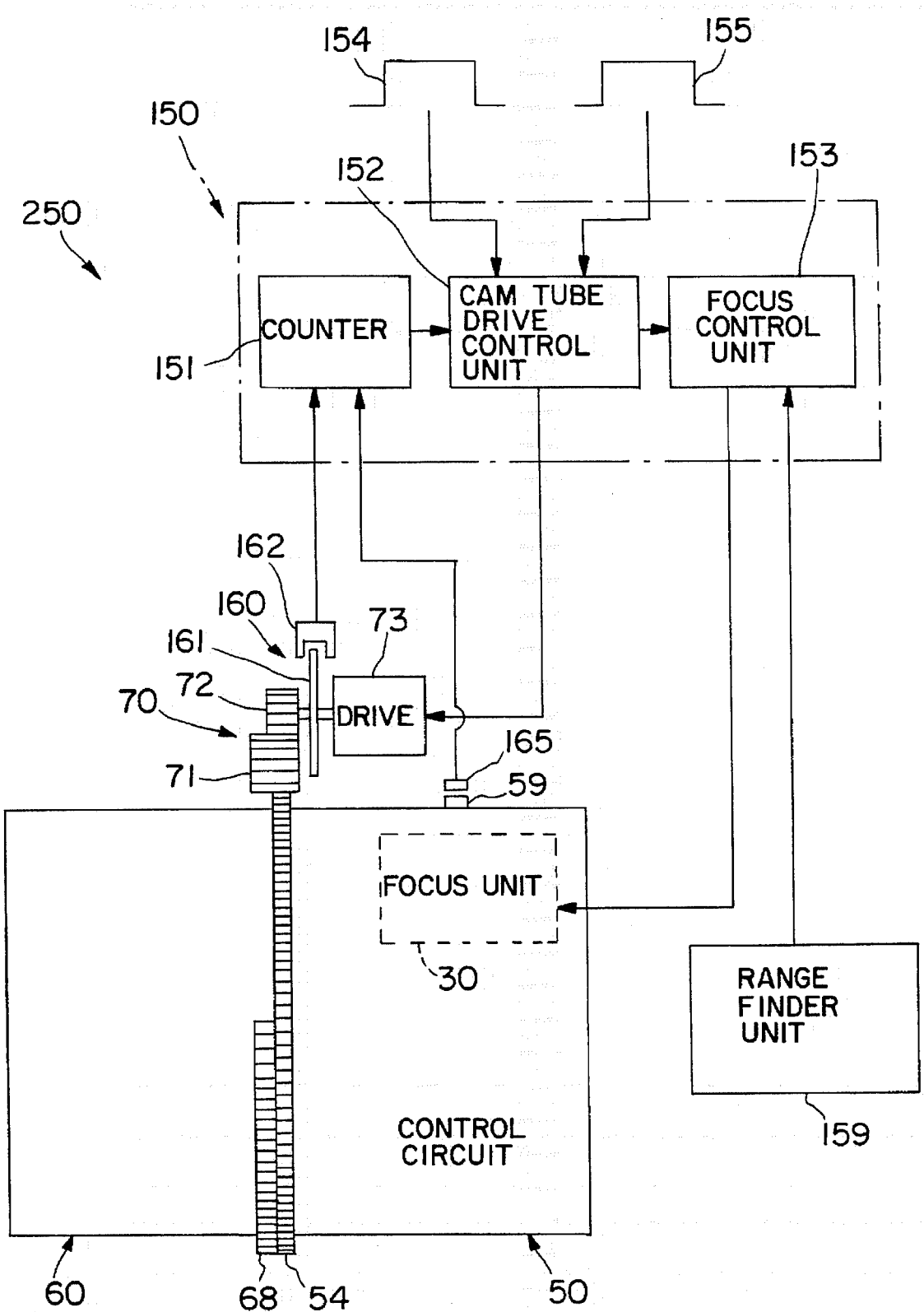
FIG. 3 is a schematic diagram illustrating a collapsed position of a collapsible zoom camera according to an embodiment of the present invention.

Control circuit 150, as illustrated in FIG. 3, includes counter 151 to count a drive amount of cam tube drive motor 73, cam tube drive control unit 152 to control cam tube drive motor 73 so that the drive amount of cam tube drive motor 73 is set to a predetermined amount, and focus control unit 153 to control the drive amount of focus unit 30. Cam tube drive control unit 152 activates various functions of camera 250 and is configured to input signals from main switch 154 in order to change the state to one in which photography is possible. Signals are output from zoom switch 155 in order for the camera operator to set the photographic magnification. Moreover, camera 250 may include an autofocus function such that signals from rangefinder unit 159 detecting the distance to a subject are input to focus control unit 153.

In the collapsible region, during operation of drive motor 73 as shown in FIG. 4, only collapsible cam tube 50 rotates circumferentially around the optical axis (the direction A in FIG. 4) because cam tube drive gear 71 cooperates only with sector gear 54 of collapsible cam tube 50. By the rotation of collapsible cam tube 50, the positions of cam 52 (formed in collapsible cam tube 50) for use by lift member 80 and the positions of cam 51 for use by first lens group 15 also move relatively with respect to the camera body.

By the movement of cam 51 (for use by lens group 15), follower pin 11 cooperates with cam 51 such that movement may be in a direction having a directional component parallel to the optical axis C. During this movement, follower pin 11 cooperates with rectilinear guide aperture 41 of fixed tube 40 and moves in a direction parallel to the optical axis because of its cylindrical portion 12a. Because of this operation, support tube 10 begins to move in a direction parallel to the optical axis C. Moreover, by movement of cam 52, follower pin 81 of lift member 80, which cooperates with oblique portion 52a of cam 52, moves with a component in the direction parallel to the optical axis C.

Lift member 80 is limited so as to move in a direction parallel to the optical axis C by lift member receiving portion 66. Lift member 80 moves in a direction parallel to the optical axis C. By movement of lift member 80, follower pin 28, which is placed in contact with lift member 80, also moves with a component in a direction parallel to the optical axis C. During such movement, follower pin 28 cooperates with rectilinear guide aperture 42 of fixed guide tube 40 and moves in a direction parallel to the optical axis C. This movement is due to interaction of cylindrical portion 29a.

Because of such movement, shutter block 20, which supports the second lens group (including lenses 23 and 27), and anti-vibration unit 25 begin to move in a direction parallel to the optical axis C.

Namely, in the collapsed position, when drive motor 73 begins operation, only collapsible cam tube 50 rotates, and first lens group 15 and the second lens group (including lenses 23 and 27) move in a direction parallel to the optical axis C. However, third lens group 36 does not move because follower pin 32 does not cooperate with cam 63 of collapsible cam tube 50.

From this state, when drive motor 73 drives further, projecting portion 53 of collapsible cam tube 50 contacts with the end of notch 67 of zoom cam tube 60. At this point, zoom cam tube 60 and collapsible cam tube 50 rotate together. The subject side end portion of cam 51 (used by first lens group 15 of collapsible cam tube 50), and the film side end of cam 61 (used by first lens group 15 of zoom cam tube 60) coincide. Accordingly, follower pin 11 used by lens group 15 transfers from cam 51 used by first lens group 15 of collapsible cam tube 50 to cam 61 for use by first lens group 15 of zoom cam tube 60.

Moreover, stop portion 92b of stop lever 91b, which has restrained the rotation of zoom cam tube 60, becomes separated from stop portion 69b. Also, zoom cam tube 60 becomes in a state in which rotation is possible with respect to the camera body. This results because cam follower end 93b of rotation restricting lever 91b contacts rotation restricting cam 55b for restricting rotation of zoom cam tube 60. Stop portion 92b oscillates with respect to cam follower end 93b with oscillation axis 94b as center. Stop portion 92b moves in a direction receding from zoom cam tube 60. Rotation restricting cam 55b is formed on collapsible cam tube 50 and moves from a step up portion to a step down portion.

When projecting portion 53 of collapsible cam tube 50 contacts the end of notch 67 of zoom cam tube 60, zoom cam tube 60 and collapsible cam tube 50 rotate together. In addition, cam tube drive gear 71 cooperates with sector gear 68 of zoom cam tube 60. At this time, lift member 80 becomes positioned in the side of the lift cam receiving portion 66 towards the photographic subject. Also, follower pin 28 used by the second lens group (including lenses 23 and 27) (which up to now was positioned within lift cam receiving portion 66 and contacting lift member 80), moves to penetrating cam 62b.

Moreover, zoom cam tube 60 begins to rotate and the position of cam 63 used by third lens group 36 in zoom cam tube 60 also begins to move with respect to the camera body. However, follower pin 32 used by third group 36 does not rotate when zoom cam tube 60 begins to rotate because it is positioned in perpendicular portion 63c of cam 63. Moreover, follower pin 11 used by lens group 15 moves with cam 63 used by lens group 36 and advances in a direction parallel to the optical axis C. Follower pin 11 thus approaches zoom cam tube 60.

In the collapsed position, when a camera operator depresses main switch 154, signals are output from cam tube drive control unit 152 to drive motor 73. Moreover, in order to simplify the description, signals from cam tube drive control unit 152 may be considered to be directly output to drive motor 73. In actuality, the signals from cam tube drive control unit 152 are output to a switching element (not shown in the drawing) which is disposed between drive motor 73 and an electrical supply (not shown in the drawing).

Next, drive motor 73 is driven, zoom cam tube 60 and collapsible cam tube 50 rotate as shown in FIG. 5 and FIG. 2, and follower pin 11 (used by first lens group 15) moves down from cam 51 (used by first lens group 15) of collapsible cam tube 50 to cam 61 (used by first lens group 15) of the zoom cam tube 60. Moreover, follower pin 28 (used by the second lens group including lenses 23 and 27) moves from cam 62b (used by the second lens group) to cam 62a (used by the second lens group) of inner cam portion 64. Furthermore, follower pin 32 (used by third lens group 36) moves from the perpendicular portion 63c of cam 63 (used by third lens group 36) to its oblique portion.

Moreover, cam tube drive gear 71, separating from sector gear 54 of collapsible cam tube 50, cooperates only with sector gear 68 of zoom cam tube 60. When such a state arises, drive motor 73 is stopped by a control device (not shown in the drawing). Such a state is the minimum magnification position in which photography is possible with minimum magnification. Moreover, directly before such a state arises, stop end 92 of stop lever 91 is stopped in stop portion 55a of collapsible cam tube 50 so that rotation with respect to the camera body is possible.

However, projecting portion 53 of collapsible cam tube 50 contacts the end of notch 67 of zoom cam tube 60, and zoom cam tube 60 and collapsible cam tube 50 begin to rotate together during the interval up to the minimum magnification position. In addition, numerous actions are performed during rotation of cam tubes 50 and 60. While the angle of rotation of cam tubes 50 and 60 is expected to be large, in actually, the rotation angle of the cam tube 50 and 60 of this interval is slight. Accordingly, just before reaching the minimum magnification position, the above numerous actions are performed.

In the state of minimum magnification, when the camera operator specifies an increased magnification, drive motor 73 is driven by an instruction from the control device (not shown). Cam tube drive gear 71 cooperates with sector gear 68 of zoom cam tube 60 and begins rotation of zoom cam tube 60 by drive motor 73. Collapsible cam tube 50 is not rotated. By such rotation of zoom cam tube 60, the positions of cam 62 (used by first lens group 15), cam 62 (used by the second lens group), and cam 63 (used by third lens group 36) formed in the zoom cam tube 60, move with respect to the camera body. In addition, follower pins 11, 28 and 32, which cooperate with cams 61, 62 and 63, move in a direction parallel to the optical axis C.

By movement of follower pins 11, 28 and 32, support tube 10 which supports first lens group 15, shutter block 20 which supports the second lens group (including lenses 23 and 27), and focusing unit 30 which supports third lens group 36, move in the direction of the optical axis C such that the camera operator can obtain the desired magnification. Then, focusing unit 30 is driven and helicoid ring 34 is caused to rotate. Therefore, third lens group 36 rotates around the optical axis C and slightly moves in a direction parallel to the optical axis C to adjust the focus state.

In the case of obtaining maximum magnification, as shown in FIG. 6, follower pin 11 (used by first lens group 15), follower pin 28 (used by the second lens group), follower pin 32 (used by third lens group 36), and respective cams 61, 62 and 63 become positioned on the side towards the subject. In addition, respective lenses 15, 23, 27 and 36 also become positioned on the side towards the subject. Follower pin 32 (used by third lens group 36) also positions cam 63 (used by third lens group 36) on the side towards the subject. However for focus adjustment, there is a case in which follower pin 32 is not positioned on the side towards the subject by way of the drive of focus unit 30.

Moreover, in the interval from the collapsed state until projecting portion 53 of collapsible cam tube 50 contacts the end of notch 67 of zoom cam tube 60, reset switch 165 (which is formed on the external circumference of collapsible cam tube 50) contacts convex portion 59 (for standard position detection) and goes from the OFF state to the ON state. Counter 151 of control circuit 150 is reset to "0". Counter 151 next counts up the number of pulses from drive amount detection sensor 160. Drive amount detection sensor 160 detects a drive amount of cam tube drive motor 73.

The variable magnification action of viewfinder 120 and the illumination angle changing action of strobe 130 will next to be described using FIG. 8. When zoom cam tube 60 rotates, the magnification change and angle change gears 111, 112 and 113 also rotate, cooperating with the sector gear 68 of zoom cam tube 60. By rotation of gear group 111, 112 and 113 by way of gear portion 114d of variable power and variable angle cam body 114, cam body 114 oscillates around oscillation axis 115 as its center.

By oscillation of cam body 114, the positions of cams 114a and 114b (for variable power viewfinder use) formed in cam body 114, and variable illumination angle cam 114c, move with respect to the camera body, and cam follower support shafts 126 and 127 of viewfinder moving lenses 121 and 122 and cam follower support shaft 134 of strobe 130 move in a component direction of the optical axis. During movement, cam follower shafts 126 and 127 of viewfinder movable lenses 121 and 122 are guided with guide shaft 116 for variable power use and strobe body 131 is guided in guide shaft 117 for variable illumination angle use. Viewfinder movable lenses 121 and 122 and strobe body 131 move in a direction parallel to the optical axis and the viewfinder magnification and the strobe illumination angle correspond with the photographic magnification.

Here, the rotation of the cam tubes 50 and 60 is simply arranged. Sector gear 54 of collapsible cam tube 50 moves from the collapsed position to just before the minimum magnification position. Moreover, sector gear 68 of zoom cam tube 60 moves from the state just before the minimum magnification position to the state of the maximum magnification position. Because of such an arrangement, with respect to rotation of cam tube drive gear 71 cooperating with sector gears 54 and 68, while becoming in the state of the minimum magnification position from the state of the collapsed position, at the beginning, only collapsible cam tube 50 rotates. However, while becoming in the state just before the minimum magnification position, collapsible cam tube 50 and zoom cam tube 60 both rotate. Moreover, while moving to the maximum magnification position from the state of minimum magnification, only zoom cam tube 60 rotates. Namely, zoom cam tube 60 rotates from the state of the minimum magnification position until the state of the maximum magnification position.

However, variable power and variable angle mechanism 110 moves by the rotation of zoom cam tube (50. Because of such an arrangement, viewfinder variable moving lenses 121 and 122 and strobe body 131 do not move from the state of the collapsed position in which photography is impossible to the state of just before the minimum magnification position. Instead, they move from the state just before the minimum magnification position up to the state of the maximum magnification position. Accordingly, in this embodiment example, the range of movement of viewfinder moving lenses 121 and 122, and of strobe body 131, or the range of oscillation of variable power and variable angle cam body 114 becomes small. In addition, the length of each cam of variable power and variable angle cam 114 becomes short, and the camera body can be designed smaller.

In general, it is usual to arrange independent drive sources when respectively causing the two tubes 50 and 60 to rotate. In the minimum magnification position, when the camera operator desires a different magnification, zoom switch 155 is switched and, again, drive motor 73 responds to instructions from cam drive control unit 152 of control circuit 150. Nevertheless, in this embodiment example, sector gears 54 and 68 are formed on the external circumferences of respective tubes 50 and 60. Also, sector gears 54 and 60 do not cause the rotation of respective tubes 50 and 60, because the region of formation of the respective sector gears 54 and 68 is fixed. By causing rotation from drive source 73 of gear 71 (which cooperates with sector gears 54 and 68), the two tubes 50 and 60 can be rotated separately. Accordingly, by separating the cam tube into two tubes 50 and 60, it is not necessary to arrange two drive sources and the size of cam tube rotation mechanism 70 is not made large.

Control circuit 150 of FIG. 3 recognizes from the count number of counter 151 that the magnification desired by the photographer has been obtained and causes the drive of the drive motor (instructed by the cam tube drive control circuit 152) to stop. In addition, control circuit 150 drives focus unit 30 by instructions from focus control unit 153. When focus control unit 30 drives, helicoid ring 134 rotates, and while rotating third lens group 36 around the optical axis, moves third lens group 38 a little in a direction parallel to the optical axis C and performs focus adjustment.

Moreover, in this embodiment example, because two separated cam tubes mutually and partially overlap, the two cam tubes 50 and 60 can mutually screen light completely therebetween. Moreover, during the range of movement of each lens, regarding the relationship by the relative rotation of collapsible cam tube 50 and zoom cam tube 60 causing lift member 80 to move, the two cam tubes 50 and 60 mutually and partially overlap. However, the topical design does not impose a limitation and completely screens light from entering.

Furthermore, because cam tube rotation restriction mechanism 90 is arranged in the state in which the cam tube on one side is not rotated, and also the cam tube on the other side is set and stopped, the rotation of the cam tube on one side does not rotate the cam tube on the other side. When follower pin 11 moves from the cam tube on one side to the cam tube on the other side, the rotational angular phase displacement of both cam tubes can be prevented.

In the case that the maximum magnification is obtained, as shown in FIG. 8, follower pin 11 (used by first lens group 15), follower pin 28 (used by the second lens group), follower pin 32 (used by third lens group 36), and each cam 61, 62 and 63 becomes positioned most towards the subject. Also, each lens 15, 23, 27 and 36 becomes positioned most towards the subject. However, follower pin 32 (used by third group 36) also positions cam 63 (used by third lens group 36) most towards the subject. For focus adjustment, the drive of focus unit 30 positions third lens group 36 in a position which is not most towards the subject.

Moreover, in the present embodiment example, inner cam 63 of zoom cam tube 60 includes the formation of inner cams 61a, 62a and 63a having grooved bottoms such that the rigidity of the zoom cam tube 60 is scarcely reduced. Even if cam follower pins 11, 18 and 32 come into contact, inner cams 61a, 62a and 63a are practically not deformed, and cam follower pins 11, 18 and 32 can be guided to accurate positions. On the other hand, in the cam portion 64 of zoom cam tube 60, the thickness of cam portion 64 is relatively increased. Thus, the cam is formed as a through cam, i.e. cam portion 64, because the collapsible cam tube 50 presses against cam portion 64 from outside. Accordingly, rigidity is scarcely reduced even though through cams 61b, 62b and 63b are formed herein although cams 61b, 62b and 63b are scarcely deformed. Moreover, because the cam of collapsible cam tube 50 is also formed as an inner cam 51, follower pin 11 cooperating here can be guided to an accurate position.

Moreover, in general, with respect to cam tubes 50 and 60, it is usual to arrange sensors and reset switches to detect the respective drive amounts. Nevertheless, because the phase relationship of the rotation angle of the two cam tubes 50 and 60 can be accurately maintained by cam tube rotation restricting mechanism 90, with respect to separately rotating cam tubes 50 and 60, the cam tubes can be compelled to correspond by one drive amount detecting sensor 160 and one reset switch 165.

Moreover in the present embodiment example, convex portion 59 is formed in a specific position on the external circumference of collapsible cam tube 50 for standard position detection use. In order to recognize the standard position of the rotation amounts of cam tubes 50 and 60 from the drive amount detection sensor 165, sensor 165 can be disposed on the zoom cam tube 60 side.

Moreover, in the present invention, because a cam tube rotation restricting mechanism has been arranged, the cam tube on one side is caused to rotate, and also the cam tube on the other side is in a standstill. Because the cam tube on the other side does not rotate from the rotation of the cam tube on the one side, a rotation angle phase displacement of the two cam tubes can be prevented when the follower projection moves down from the cam tube on the one side to the cam tube on the other side. As a result, in relation to the recognition of the rotation amount of the two cam tubes and the resetting of this rotation amount, the two cam tubes can be respectively placed in correspondence by a single drive unit.

Although a few of the preferred embodiments have been shown and described, it would be appreciated by those skilled in the art that changes may be made in these embodiments without departing from the principles and spirit of the invention, the scope of which is defined in the following claims and their equivalents. Further, one of ordinary skill in the art will recognize that while the preferred embodiments have been shown and described as being used within an optical camera, they may be adapted for use in any device in which it is desirable to suppress blurring of an image formed by an optical system or to provide a collapsible lens, for example, in camcorders, motion picture cameras, telescopes, binoculars, microscopes, range finding equipment, lasers, fiber optic communication systems, various optical projection systems and CD mastering systems.

What is claimed is:

1. A collapsible zoom camera having an optical axis, comprising:
   a camera body;
   a drive unit to provide a drive force;
   a support tube supporting a lens unit to focus the optical axis onto a focal plane;
   a collapsible cam tube disposed entirely within said camera body and rotatable around a portion of said support tube, wherein said collapsible cam tube is directly connected to said support tube and urges said support tube along said optical axis to adjust said lens unit from a position in which said optical axis cannot be focused to a position of minimum magnification;

a zoom cam tube disposed entirely within said camera body and overlapping a portion of said collapsible cam tube such that a non-overlapping portion of said collapsible cam tube is disposed between said zoom cam tube and said focal plane, wherein said zoom cam tube is directly connected to said support tube and urges said support tube along said optical axis to adjust said lens unit;

a viewfinder;

a drive force transmission unit to transmit the drive force to said collapsible cam tube without transmission to said viewfinder, and to simultaneously transmit the drive force to said zoom cam tube and said viewfinder;

a drive amount detection unit to detect an amount of movement of said zoom cam tube in response to the drive force;

a reset unit to reset a drive amount when a standard amount of movement has been detected by said drive amount detection unit; and a control unit to control said drive unit based on the amount of movement detected by said drive amount detection unit.

2. A collapsible zoom camera comprising:

camera body enclosing a focal plane disposed along an optical axis;

a drive unit to provide a drive force;

a collapsible cam tube disposed entirely within said camera body and movable in a first region along the optical axis;

a zoom cam tube disposed entirely within said camera body and overlapping said collapsible cam tube such that a non-overlapping portion of said collapsible cam tube is disposed between said zoom cam tube and said focal plane, said zoom cam tube being movable in a second region along the optical axis;

a light emission system;

a photographic optical system movement unit;

a light emission control unit;

a drive force transmission unit to transmit the drive force to said zoom cam tube and to said light emission control unit while said collapsible cam tube moves in the first region and to stop transmitting the drive force to said light emission control unit while said zoom cam tube moves in the second region;

a drive amount detection unit to detect an amount of total movement of said collapsible cam tube and said zoom cam tube;

a reset unit to reset a drive amount when a standard amount of movement has been detected by said drive amount detection unit; and a control unit to control said drive unit based on the amount of movement detected by said drive amount detection unit.

3. A collapsible camera comprising:

a camera body enclosing a focal plane along an optical axis;

a drive unit disposed within the camera body and providing a drive force;

a first lens unit disposed along the optical axis;

a support tube supporting said first lens unit during movement along the optical axis to focus the optical axis onto the focal plane, said support tube including a pin;

a collapsible cam tube surrounding a portion of said support tube and disposed entirely within said camera body, said collapsible cam tube defining a first cam groove which connects with the pin and urges said support tube along the optical axis during rotation to adjust said first lens unit from a position in which said optical axis cannot be focused to a position of minimum magnification;

a zoom cam tube surrounding said support tube and overlapping a portion of said collapsible cam tube such that a non-overlapping portion of said collapsible cam tube is disposed between said zoom cam tube and said focal plane, said second cam tube disposed entirely within said camera body and defining a second cam groove which connects with the pin and urges said support tube along the optical axis during rotation to move said first lens unit from the position of minimum magnification to a position of maximum magnification; and a viewfinder connectable with said zoom cam tube to adjust viewfinder magnification in proportion to the adjustment of said collapsible cam tube and to not adjust viewfinder magnification during the adjustment of said zoom cam tube.

4. The optical device as claimed in claim 3, further comprising:

a first notch disposed within the collapsible cam tube; and a first projecting portion extending from the zoom cam tube and received within the first notch such that the zoom cam tube and the collapsible cam tube rotate together during a portion of the first operating range.

5. The optical device as claimed in claim 4, further comprising:

a second notch disposed within the collapsible cam tube; and a second projecting portion extending from the zoom cam tube and received within the second notch such that the zoom cam tube and the collapsible cam tube rotate together during said portion of the first operating range.

6. The optical device as claimed in claim 5, further comprising:

a third notch disposed within the collapsible cam tube; and a third projecting portion extending from the zoom cam tube and received within the third notch such that the zoom cam tube and the collapsible cam tube rotate together during said portion of the first operating range.

7. The optical device as claimed in claim 3, further comprising:

a cam tube rotation restriction mechanism which restricts rotation of the collapsible cam tube during a portion of the first operating range of the drive unit.

8. The optical device as claimed in claim 3, further comprising:

a cam tube rotation restriction mechanism which restricts rotation of the zoom cam tube during the second operating range of the drive unit.

9. The optical device as claimed in claim 3, further comprising:

a drive amount detection unit which detects an amount of movement of the drive unit during the first and second operating range.

10. The optical device as claimed in claim 3, further comprising:

a fixed tube connected to the body within the internal cavity and surrounding the collapsible cam tube and the zoom cam tube to thereby reduce light from entering therein.

11. The optical device as claimed in claim 3, further comprising:

a spiral cam portion formed within the collapsible cam tube; and a follower projection extending from the zoom cam tube and cooperating with the spiral cam portion of the collapsible cam tube during rotation of the collapsible cam tube and the zoom cam tube.

12. The optical device as claimed in claim 3, further comprising:

a strobe having a variable illumination angle wherein the variable illumination angle changes in proportion to magnification of the first lens unit during the second operating range of the drive unit.

13. The optical device as claimed in claim 3, further comprising:

a second lens unit disposed within the camera body and optically aligned with the first lens unit; and an anti-vibration unit connected to the second lens unit and providing vibration compensation to the collapsible optical device.

14. The optical device as claimed in claim 13, further comprising:

a third lens unit disposed within the camera body and optically aligned with the first and second lens units; and a helicoid ring which causes the third lens unit to rotate with respect to the first and second lens units.

\* \* \* \* \*